US011865984B2

(12) United States Patent
Sakamoto

(10) Patent No.: US 11,865,984 B2
(45) Date of Patent: Jan. 9, 2024

(54) VEHICLE POWER SUPPLY DEVICE

(71) Applicant: DENSO CORPORATION, Kariya (JP)

(72) Inventor: Keiya Sakamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 291 days.

(21) Appl. No.: 17/479,695

(22) Filed: Sep. 20, 2021

(65) Prior Publication Data

US 2022/0001817 A1 Jan. 6, 2022

Related U.S. Application Data

(63) Continuation of application No. PCT/JP2020/005208, filed on Feb. 11, 2020.

(30) Foreign Application Priority Data

Mar. 26, 2019 (JP) ................................ 2019-058820

(51) Int. Cl.

*B60R 16/033* (2006.01)
*H02J 7/00* (2006.01)
*H02M 3/158* (2006.01)

(52) U.S. Cl.

CPC .......... *B60R 16/033* (2013.01); *H02J 7/0063* (2013.01); *H02M 3/158* (2013.01)

(58) Field of Classification Search

CPC ...... B60R 16/033; B60R 16/03; H02J 7/0063; H02M 3/158; H02M 1/008; H02M 1/36

See application file for complete search history.

(56) References Cited

U.S. PATENT DOCUMENTS

| | | | | |
|---|---|---|---|---|
| 2011/0187183 | A1* | 8/2011 | Kimura | B60L 50/60 307/9.1 |
| 2017/0327003 | A1* | 11/2017 | Oyanagi | B60L 50/51 |
| 2018/0175774 | A1* | 6/2018 | Nakayama | B60L 58/21 |
| 2018/0334043 | A1* | 11/2018 | Zou | H02M 1/08 |

FOREIGN PATENT DOCUMENTS

| | | | |
|---|---|---|---|
| JP | H08084055 | A | 3/1996 |
| JP | 2009095214 | A | 4/2009 |
| JP | 2014204609 | A | 10/2014 |
| JP | 2017043342 | A | 3/2017 |

* cited by examiner

*Primary Examiner* — Lincoln D Donovan
*Assistant Examiner* — Alex W Lam
(74) *Attorney, Agent, or Firm* — Harness, Dickey & Pierce, P.L.C.

(57) ABSTRACT

A vehicle power supply device includes a voltage decrease circuit, a control unit, and a voltage increase power supply unit. The voltage decrease circuit includes multiple MOSFETs as switching elements, receives a voltage supplied from a battery, decreases, by turning on and turning off the switching elements, the received voltage to an operation voltage of an operation target device, and outputs the decreased voltage to the operation target device. The control unit controls an operation of the voltage decrease circuit. The voltage increase power supply unit is connected with the voltage decrease circuit in parallel, receives the voltage supplied from the battery, increases the received voltage, and outputs the increased voltage to the control unit.

1 Claim, 5 Drawing Sheets

FIG. 4

| | STATE | Va | Vo | ALLOWED ΔV | I | Required Ron | Vgs |
|---|---|---|---|---|---|---|---|
| EMBODIMENT | NORMAL OPERATION | 3.4 TO 3.7V -min | 3.3V | 0.1 TO 0.3V | 5A | SMALL | HIGH |
| | STANDBY | 5.3V -min | 3.3V | 2.0V | 0.1A | MAY BE LARGE | HIGH |
| COMPARATIVE EXAMPLE | NORMAL OPERATION | 3.4 TO 3.7V -min | 3.3V | 0.1 TO 0.3V | 5A | SMALL | LOW |
| | STANDBY | 5.3V -min | 3.3V | 2.0V | 0.1A | MAY BE LARGE | HIGH |

FIG. 5

| ECU STATE | VOLTAGE INCREASE POWER SUPPLY | SUB VOLTAGE DECREASE POWER | CONTROL IC | CURRENT CONSUMPTION |
|---|---|---|---|---|
| OFF | VOLTAGE INCREASE OPERATION DEACTIVATED (POWER ON STATE) | OFF | OFF | – |
| STANDBY | VOLTAGE INCREASE OPERATION DEACTIVATED (POWER ON STATE) | ON | ON | SUB VOLTAGE DECREASE POWER +CONTROL IC +OPERATION CURRENT |
| NORMAL OPERATION | VOLTAGE INCREASE OPERATION ACTIVATED | ON | ON | SUM |

FIG. 6

| ECU STATE | VOLTAGE INCREASE POWER SUPPLY | SUB VOLTAGE DECREASE POWER | CONTROL IC | CURRENT CONSUMPTION |
|---|---|---|---|---|
| OFF | VOLTAGE INCREASE OPERATION DEACTIVATED (POWER ON STATE) | OFF | OFF | – |
| STANDBY | VOLTAGE INCREASE OPERATION DEACTIVATED (POWER ON STATE) | ON | ON | SUB VOLTAGE DECREASE POWER +CONTROL IC +OPERATION CURRENT |
| NORMAL OPERATION | VOLTAGE INCREASE OPERATION ACTIVATED | ON | ON | SUM +POWER LOSS CAUSED BY VOLTAGE INCREASE OF CONTROL IC |

VEHICLE POWER SUPPLY DEVICE

CROSS REFERENCE TO RELATED APPLICATIONS

The present application is a continuation application of International Patent Application No. PCT/JP2020/005208 filed on Feb. 11, 2020, which designated the U.S. and claims the benefit of priority from Japanese Patent Application No. 2019-058820 filed on Mar. 26, 2019. The entire disclosures of all of the above applications are incorporated herein by reference.

TECHNICAL FIELD

The present disclosure relates to a vehicle power supply device.

BACKGROUND

Conventionally, a vehicle power supply device including a voltage increase circuit and a voltage decrease circuit is known.

SUMMARY

The present disclosure provides a vehicle power supply device including a voltage decrease circuit, a control unit, a voltage increase power supply unit, and a voltage increase control unit. The voltage decrease circuit includes multiple MOSFETs as switching elements, receives a voltage supplied from a battery, decreases, by turning on and turning off the switching elements, the received voltage to an operation voltage of an operation target device, and outputs the decreased voltage to the operation target device. The control unit controls an operation of the voltage decrease circuit. The voltage increase power supply unit is connected with the voltage decrease circuit in parallel, receives the voltage supplied from the battery, increases the received voltage, and outputs the increased voltage to the control unit. The voltage increase control unit switches a state of the voltage increase power supply unit between a power on state in which a voltage increase operation is deactivated and a voltage increase operation state in which the voltage increase operation is activated. The operation target device is provided by a computer. The computer is configured to operate: in a normal state in which a circuit operation is performed; and in a standby state in which a part of the circuit operation is deactivated. When the computer operates in the standby state, the voltage increase control unit controls the voltage increase power supply unit to operate in the power on state in which the voltage increase operation is deactivated. When the computer operates in the normal state, the voltage increase control unit controls the voltage increase power supply unit to execute the voltage increase operation.

BRIEF DESCRIPTION OF DRAWINGS

Objects, features and advantages of the present disclosure will become apparent from the following detailed description made with reference to the accompanying drawings. In the drawings:

FIG. 4 is a table showing voltages at a point A in the embodiment of the present disclosure and in the comparative example;

FIG. 5 is a diagram showing respective current consumptions in an off state, a standby state, a normal operating state in the ECU of the comparative example; and FIG. 6 is a diagram showing respective current consumptions in an off state, a standby state, a normal operating state in the ECU of the embodiment of the present disclosure.

DETAILED DESCRIPTION

Figure 1:
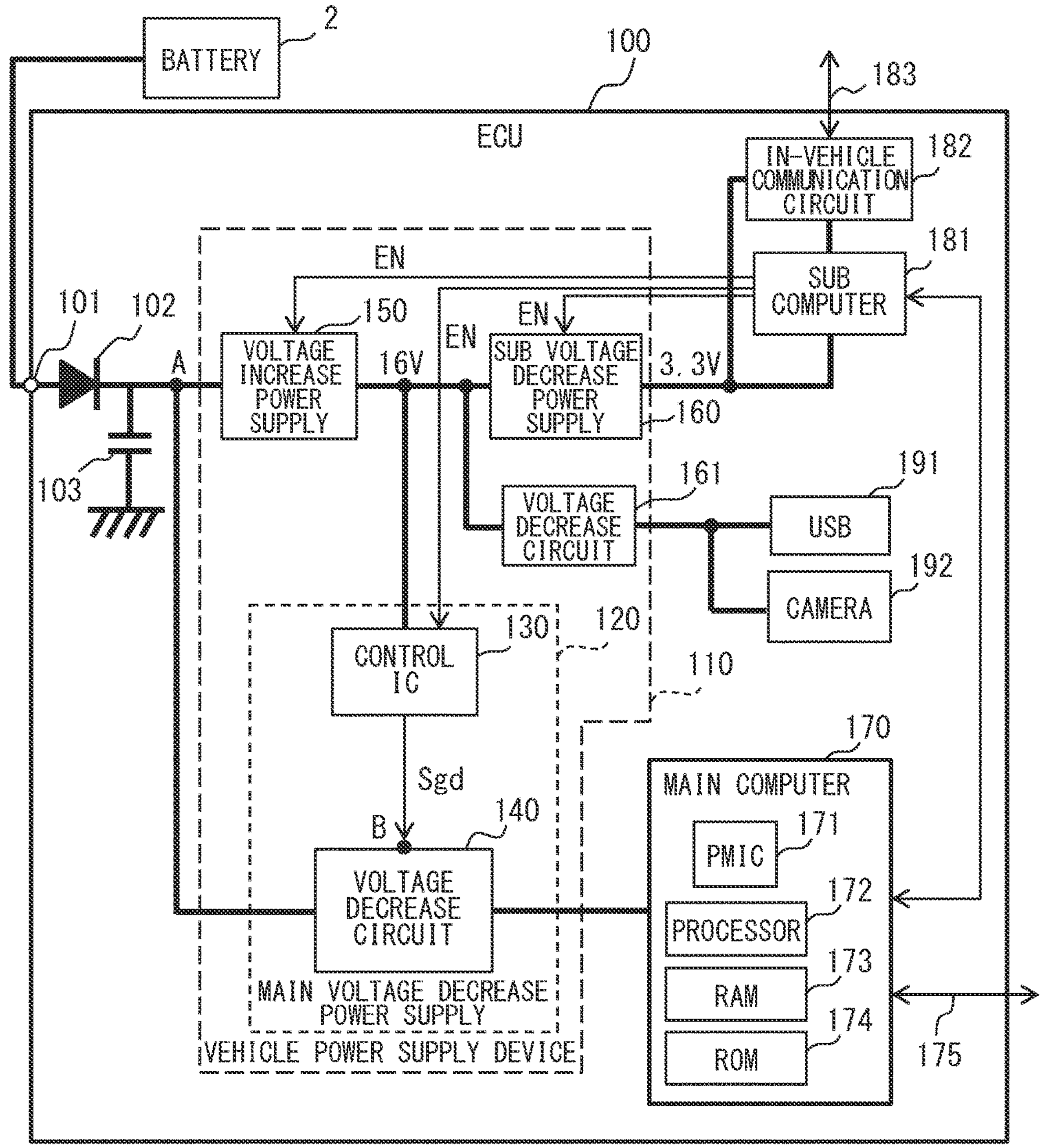
FIG. 1 is a diagram showing a configuration of an ECU including an in-vehicle power supply device according to an embodiment of the present disclosure.

Before describing embodiments of the present disclosure, a vehicle power supply device in a known art will be described.

In a vehicle power supply device according to a known art, when a temporary decrease of voltage, such as a brownout occurs in response to, for example, a return from an idling stop state, a voltage supplied from the in-vehicle power supply device to an electronic control device may decrease to a level lower than a reset voltage of the electronic control device. When the voltage supplied to the electronic control device decreases to a level lower than the reset voltage, the electronic control device is reset.

In order to prevent the voltage supplied to the electronic control device from being temporarily decreased, in a known art, a primary voltage decrease circuit is provided to a battery. Specifically, a voltage output from the primary voltage decrease circuit is set to be lower than a voltage obtained by subtracting, from a power supply voltage, a sum of a maximum voltage decrease amount estimated in the brownout caused by the return from the idling stop state and a maximum voltage decrease amount caused by a voltage drop of a diode. With this configuration, it is possible to prevent the voltage input to the primary voltage decrease circuit from becoming lower than the voltage output from the primary voltage decrease circuit. Since the voltage output from the primary voltage decrease circuit becomes stable, the voltage output from a secondary voltage decrease circuit or a voltage increase circuit also becomes stable.

In the above-described art, when the battery voltage decreases, a difference between the input voltage and the output voltage of the battery becomes small. With a decrease in the battery voltage decreases, a gate-source voltage of a MOSFET included in the primary voltage decrease circuit also decreases. When the gate-source voltage decreases, the MOSFET operates in a region close to an active region. The MOSFET has a large on-resistance value in a region close to the active region. As the on-resistance value increases, a voltage drop in the MOSFET increases even the current maintains the same. The voltage drop in the MOSFET is required to be smaller than the difference between the input voltage and the output voltage of the voltage decrease circuit. Therefore, for the above-described primary voltage decrease circuit in which the difference between the input voltage and the output voltage is controlled to be small, it is necessary to use a MOSFET in which the on-resistance value does not increase even at a low gate-source voltage. However, such MOSFETs are expensive.

According to an aspect of the present disclosure, a vehicle power supply device includes a voltage decrease circuit, a control unit, and a voltage increase power supply unit. The voltage decrease circuit includes multiple MOSFETs as switching elements, receives a voltage supplied from a battery, decreases, by turning on and turning off the switching elements, the received voltage to an operation voltage of an operation target device, and outputs the decreased voltage to the operation target device. The control unit controls an operation of the voltage decrease circuit. The voltage increase power supply unit is connected with the voltage decrease circuit in parallel, receives the voltage supplied from the battery, increases the received voltage, and outputs the increased voltage to the control unit.

The vehicle power supply device includes the voltage increase power supply unit that increases the voltage supplied from the battery, and the voltage increased by the voltage increase power supply unit is input to the control unit. With this configuration, when the battery voltage decreases, the decreased voltage is increased by the voltage increase power supply unit, and then input to the control unit. Therefore, when the battery voltage temporarily drops, the voltage input to the control unit becomes higher compared with a case where the battery voltage is directly input to the voltage decrease circuit without being treated by the voltage increase power supply unit.

With above configuration, the voltage input to the voltage decrease circuit can be increased in a case where the battery voltage temporarily drops. Thus, the control unit can use a normal MOSFET rather than the high-cost MOSFET that has a low on-resistance at a low gate-source voltage, and controls turn-on and turn-off of the normal MOSFET. Therefore, a stable voltage can be output without using the MOSFET that has low on-resistance at low gate-source voltage.

The voltage increase power supply unit is provided in parallel with the voltage decrease circuit. Thus, the voltage increased by the voltage increase power supply unit is not input to the voltage decrease circuit. When a large current flows into an operation target device of the voltage decrease circuit, the large current also flows through the voltage decrease circuit. Therefore, in a configuration where the voltage increase power supply unit is connected in series with the voltage decrease circuit, when the large current flows through the voltage decrease circuit, the large current also flows through the voltage increase power supply unit, and a current consumption may increase. In the above vehicle power supply device, since the voltage increase power supply unit is connected in parallel with the voltage decrease circuit, an increase in current consumption of the voltage increase power supply unit can be suppressed.

The following will describe an embodiment of the present disclosure with reference to the drawings. FIG. 1 is a diagram showing a configuration of an electronic control unit (ECU) 100 that includes a vehicle power supply device 110. The ECU 100 is mounted on a vehicle. For example, the ECU 100 may execute an image drawing process for drawing an image to be displayed on a display device.

(Configuration of ECU 100)

The ECU 100 is supplied with power from a battery 2. A node 101 is electrically connected to the battery 2. Hereinafter, the term "connection" also includes electrical connection. The electric power supplied from the battery 2 is transferred through the node 101 to electronic components included in the ECU 100. A diode 102 is connected to the node 101.

The diode 102 is provided to prevent backflow of current to the battery 2. One terminal of a capacitor 103 is connected to a cathode of the diode 102. The other terminal of the capacitor 103 is grounded. The capacitor 103 supplies electric power to downstream components when the voltage from the battery 2 temporarily drops due to brownout or power flicker.

The ECU 100 includes a vehicle power supply device 110, a main computer 170, a sub computer 181, an in-vehicle communication circuit 182, a USB port 191, and a camera port 192.

The in-vehicle power supply device 110 includes a main voltage decrease power supply unit 120, a voltage increase power supply unit 150, a sub voltage decrease power supply unit 160, and a voltage decrease circuit 161. The main voltage decrease power supply unit 120 includes a control IC 130 and a voltage decrease circuit 140. The control IC 130 corresponds to a control unit of the main voltage decrease power supply unit 120. The voltage increased by the voltage increase power supply unit 150 is input to the control IC 130. The control IC 130 controls an operation, that is, turn-on and turn-off of the voltage decrease circuit 140. The voltage decrease circuit 140 is connected to the battery 2 via the diode 102. The voltage decrease circuit 140 is a DC-DC converter, and decreases the input voltage to a predetermined voltage and outputs the decreased voltage to the main computer 170. That is, the main computer 170 corresponds to an operation target device of the main voltage decrease power supply unit 120, and operates with the voltage output from the main voltage decrease power supply unit 120. For example, the voltage output from the voltage decrease circuit 140 may be set to 3.3 V in the present embodiment.

The voltage increase power supply unit 150 is connected to the battery 2 via the diode 102, and is connected in parallel with the voltage decrease circuit 140. The voltage increase power supply unit 150 increases the input voltage and outputs the increased voltage. For example, the voltage output by the voltage increase power supply unit 150 may be set to 16 V in the present embodiment. The voltage increase power supply unit 150 supplies a power supply voltage to an electronic component included in the ECU 100 which requires a high voltage supply. Specifically, the electronic components that require the high voltage include the USB port 191 and the camera port 192. The voltage output from the voltage increase power supply unit 150 is also input to the control IC 130. The voltage output from the voltage increase power supply unit 150 is not input to the voltage decrease circuit 140.

The voltage increased by the voltage increase power supply unit 150 is input to the sub voltage decrease power supply unit 160. The sub voltage decrease power supply unit 160 decreases the input voltage, and outputs decreased voltage to the sub computer 181 and the in-vehicle communication circuit 182. For example, the voltage output from the sub voltage decrease power supply unit 160 may be set to 3.3 V in the present embodiment. The sub voltage decrease power supply unit 160 includes a voltage decrease circuit that decreases the voltage and a control unit that controls turn-on and turn-off of the voltage decrease circuit.

The voltage increased by the voltage increase power supply unit 150 is input to the voltage decrease circuit 161. The voltage decrease circuit 161 decreases the input voltage, and outputs the decreased voltage to the USB port 191 and the camera port 192. For example, the voltage output from the voltage decrease circuit 161 may be set to 9 V in the present embodiment.

The main computer 170 is executes a drawing process or the like, and includes a power management IC (hereinafter referred to as PMIC) 171, a processor 172, a RAM 173, and a ROM 174. The PMIC 171 decreases the voltage output from the voltage decrease circuit 140 to multiple voltages, and supplies the multiple decreased voltages to various electronic components included in the main computer 170. The PMIC 171 may also supply the input voltage to certain electronic components included in the main computer 170 without lowering the input voltage. For example, the voltages after being decreased by the PMIC 171 may include 1.8 V, 1.25 V, 1.05 V or the like. A state of the main computer 170 includes a standby state, a normal state, or the like. In the standby state, certain circuits included in the main computer 170 that are configured to operate in the normal state are deactivated. For example, in the standby state, the operation of RAM is maintained, and other operations that are not related to maintaining the operation of RAM may be deactivated.

The ROM 174 stores programs to be executed by the processor 172. The RAM 173 temporarily stores the calculation result and the like when the processor 172 executes the program. The processor 172 executes the program stored in the ROM 174 to perform calculations, such as drawing processing. The processor 172 outputs a signal indicating a calculation result to a signal line 175. The main computer 170 can also communicate with an information terminal or the like via the signal line 175.

The sub computer 181 includes a backup power supply, and controls turn-on and turn-off of the vehicle power supply device 110. Specifically, when the vehicle power supply device 110 is turned on, the sub computer 181 outputs an enable signal EN to the voltage increase power supply unit 150, the sub voltage decrease power supply unit 160, and the control IC 130 of the main voltage decrease power supply unit 120. Therefore, the sub-computer 181 corresponds to a voltage increase control unit that controls an activation of the voltage increase power supply unit 150. The sub computer 181 also instructs the voltage increase power supply unit 150 to stop the voltage increase operation.

The in-vehicle communication circuit 182 communicates with an external device of the ECU 100 via a signal line 183. The signal received by the in-vehicle communication circuit 182 via a communication with the external device includes a start signal. The in-vehicle communication circuit 182 outputs the received signal to the sub computer 181.

(Configuration of Voltage Increase Power Supply Unit 150)

Figure 2:
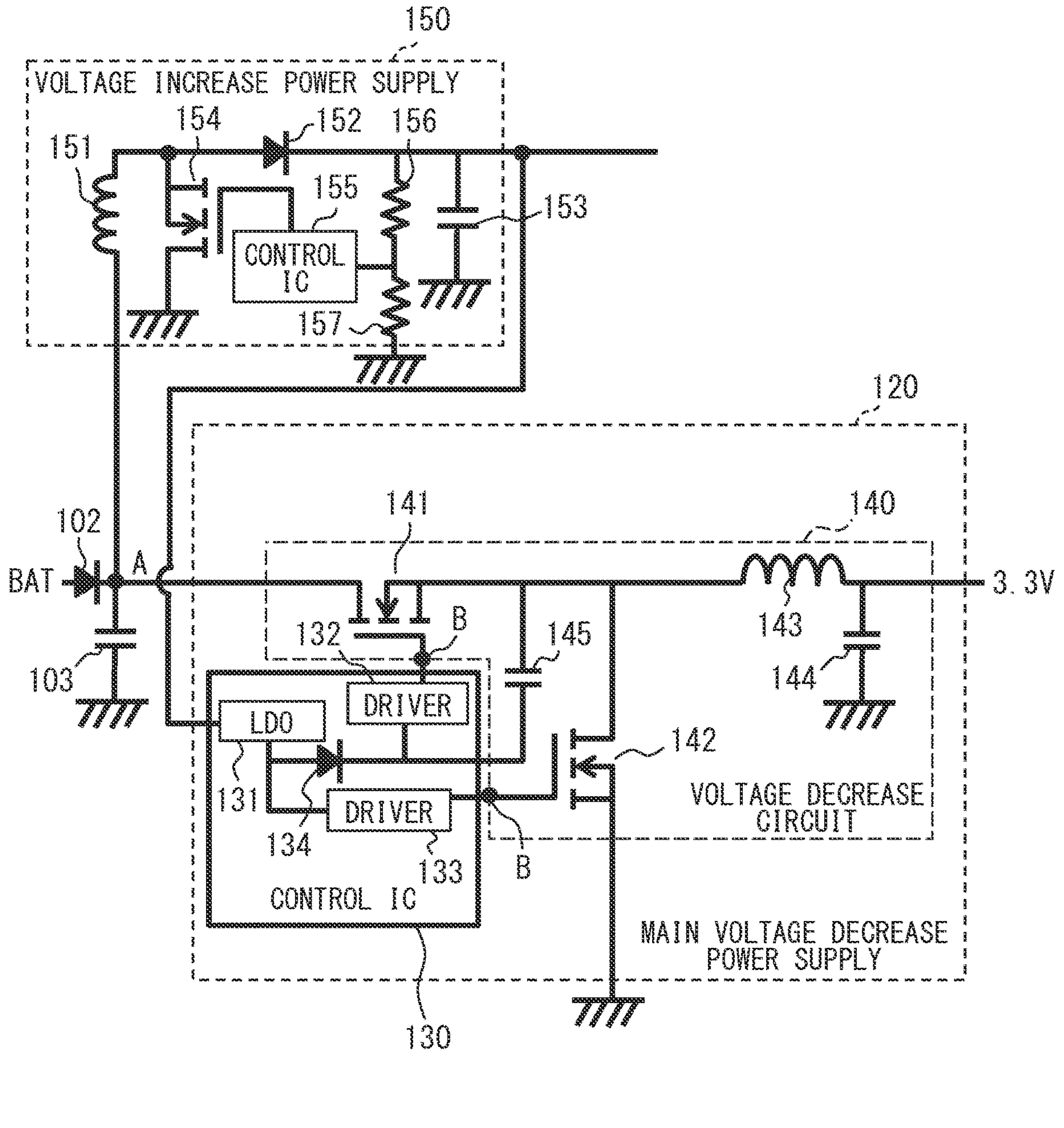
FIG. 2 is a diagram showing an example of a specific configuration of a voltage increase power supply unit and a main voltage decrease power supply unit.

FIG. 2 shows an example of a specific configuration of the voltage increase power supply unit 150 and the main voltage decrease power supply unit 120. The voltage increase power supply unit 150 includes a coil 151 and a diode 152, which are connected in series. The voltage increase power supply unit 150 includes a capacitor 153, and one end of the capacitor 153 is connected to a cathode of the diode 152. The other end of the capacitor 153 is grounded. The voltage increase power supply unit 150 includes a MOSFET 154, and the drain terminal of the MOSFET 154 is connected to a point between the coil 151 and the diode 152. The MOSFET 154 is turned on and off by a control IC 155 included in the voltage increase power supply unit 150. The control IC 155 receives the enable signal EN from the sub computer 181.

The control IC 155 turns on in response to an input of the enable signal. The voltage increase power supply unit 150 includes resistor 156 that is connected to the cathode of the diode 152. The voltage increase power supply unit 150 includes another resistor 157, and one end of another resistor 157 is connected to the other end of the resistor 156. The other end of the resistor 157 is grounded. The control IC 155 operates with an input voltage divided by the two resistors 156 and 157. In the voltage increase power supply unit 150 configured as described above, an induced voltage generated in the coil 151 by turn-on and turn-off of the MOSFET 154 is charged in the capacitor 153. The voltage of the battery 2 is increased by adding the voltage charged in the capacitor 153 to the voltage of the battery 2.

By turning on and turning off the MOSFET 154 using the control IC 155, the voltage increase power supply unit 150 increases the input voltage, and outputs the increased voltage. This operation state corresponds to a voltage increase operation state of the voltage increase power supply unit 150. In a state where the MOSFET 154 maintains off state, the voltage increase power supply unit 150 operates in a power on state in which the voltage increase operation is deactivated and the input voltage is output without being increased.

(Configuration of Main Voltage Decrease Power Supply Unit 120)

As shown in FIG. 2, the voltage decrease circuit 140 includes two switching elements, that is, a high side MOSFET 141 and a low side MOSFET 142. The voltage decrease circuit 140 further includes a coil 143 and two capacitors 144, 145. When the high side MOSFET 141 is in on state, the capacitor 144 is charged with a voltage difference between the voltage output from the diode 102 and a self-induced voltage generated by the coil 143. When the low side MOSFET 142 is in on state, the voltage charged in the capacitor 144 is provided as an output voltage Vo of the voltage decrease circuit 140.

The control IC 130 includes a low dropout (LDO) 131 provided by a constant voltage circuit, two drivers 132, 133, and a diode 134.

The LDO 131 is a linear regulator that operates with a low potential difference between the input voltage and the output voltage. The voltage regulated by the LDO 131 is input to the two drivers 132 and 133 via the diode 134. The driver 132 includes a charge pump, and increases the voltage output from the LDO 131. The driver 132 controls turn-on and turn-off of the high side MOSFET 141 with the increased voltage. The driver 133 controls turn-on and turn-off of the low side MOSFET 142 with the voltage output from the LDO 131. The enable signal output from the sub computer 181 is input to the drivers 132 and 133.

Similar to the main voltage decrease power supply unit 120, the sub voltage decrease power supply unit 160 includes a voltage decrease circuit and a control IC for controlling the voltage decrease circuit.

(Operation of ECU 100 in Normal Startup)

In the normal operation state, but not the standby state, when the sub computer 181 receives the start signal from the in-vehicle communication circuit 182, the sub computer 181 outputs the enable signal EN to the control IC 155 of the voltage increase power supply unit 150 and the control IC included in the sub voltage decrease power supply unit 160. The voltage increase power supply unit 150 and the sub-voltage decrease power supply unit 160 turn on in response to the enable signal, and the battery 2 supplies power to the sub computer 181 and the in-vehicle communication circuit 182.

When the start processes of the sub computer 181 and the in-vehicle communication circuit 182 are completed, the sub computer 181 outputs the enable signal EN to the control IC 130 of the main voltage decrease power supply unit 120. Upon receiving the enable signal EN, the control IC 130 starts to control the voltage decrease circuit 140 with the voltage increased by the voltage increase power supply unit 150. As a result, the power supply to the main computer 170 is started.

(Operation of ECU 100 in Standby State)

The following will describe the operation of ECU 100 in the standby state. The conditions for switching to the standby state can be set in various manners. For example, when a signal indicating that a switching condition to the standby state is satisfied, such as an absence of passenger in the vehicle, is input to the in-vehicle communication circuit 182 via the signal line 183, the operation state is switched to the standby state.

When the sub computer 181 determines that the switching condition to the standby state is satisfied, the sub computer 181 communicates with the main computer 170. After a preparation for the switching to the standby state in the main computer 170 is completed, the sub computer 181 switches the vehicle power supply device 110 to the standby state.

In the standby state, the main voltage decrease power supply unit 120 and the sub voltage decrease power supply unit 160 maintain on states. In the standby state, the voltage increase power supply unit 150 is turned off. These on and off states are controlled by the sub computer 181. Alternatively, these on and off states may be controlled by the main computer 170. When the voltage increase power supply unit 150 is turned off, the voltage of the battery 2 is input to the control IC 130 without being increased. When the voltage of the battery 2 is input to the control IC 130 without being increased, the high side MOSFET 141 and the low side MOSFET 142 each is likely to operate in a region close to the active region, and the on-resistance is likely to increase and the power consumption is likely to increase accordingly.

In the standby state, the main computer 170 has a low power consumption. The smaller the power consumption, the smaller the voltage drop due to brownout or power flicker. Therefore, in the standby state, when the brownout or power flicker occurs, the voltages input to the voltage increase power supply unit 150 and the voltage decrease circuit 140 do not substantially decrease compared with the voltage decrease in the normal operation state.

(Comparative Example)

Figure 3:
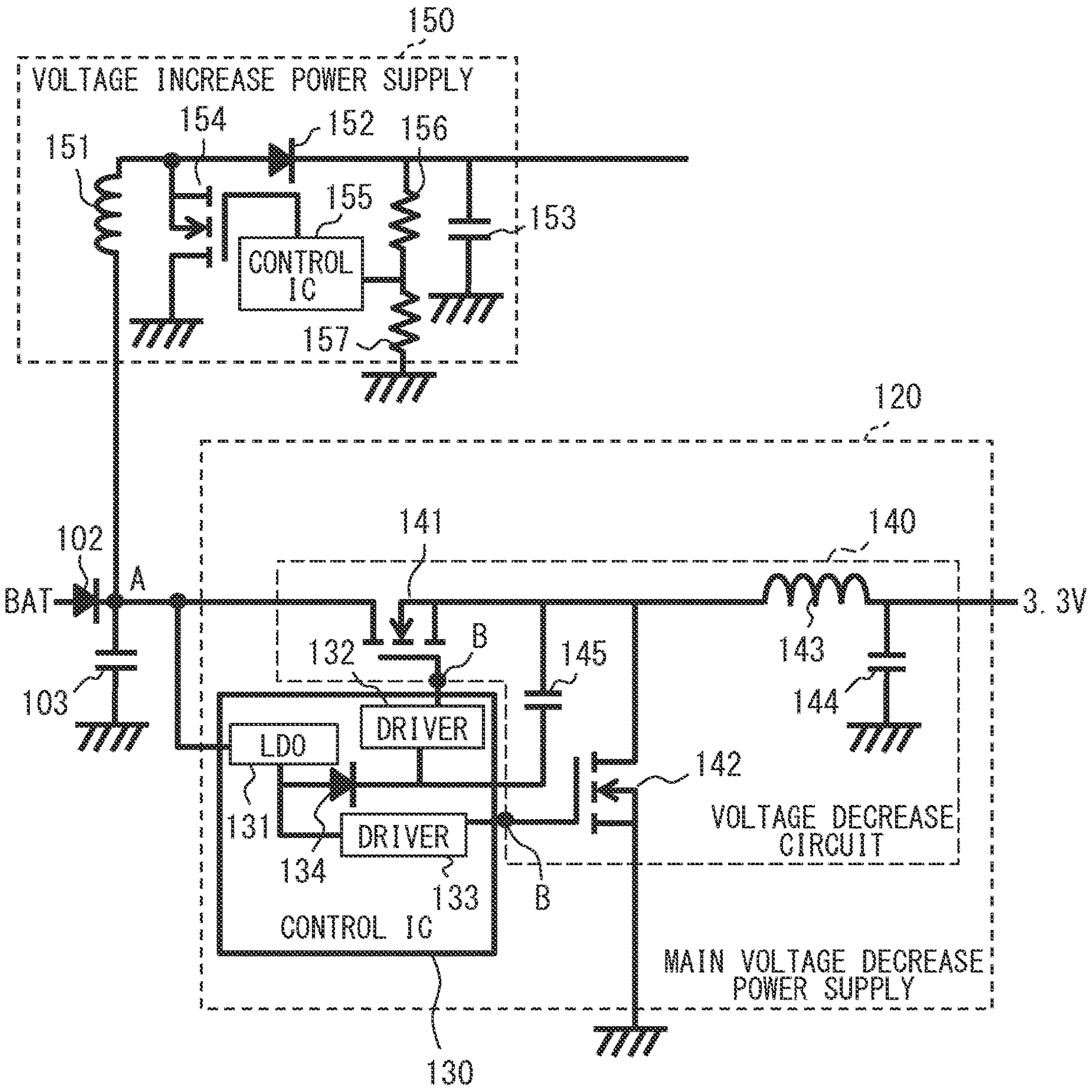
FIG. 3 is a diagram showing a configuration of a comparative example.

The following will describe a comparative example in order to describe the effect of the present embodiment in an easy to understand manner. The comparative example shown in FIG. 3 has the same voltage increase power supply unit 150 as that of the present embodiment.

In the configuration of the comparative example, the voltage increased by the voltage increase power supply unit 150 is not input to the control IC 130. In the configuration of the comparative example, the voltage increased by the voltage increase power supply unit 150 is only input to the sub voltage decrease power supply unit 160 and the voltage decrease circuit 161. In the comparative example, the voltage from the battery 2 is input to the control IC 130 via the diode 102, similar to the voltage input to the voltage increase power supply unit 150 from the battery 2.

(Effects of Present Embodiment)

FIG. 4 shows a voltage Va at the point A when a temporary voltage drop occurs in the ECU 100 due to brownout or power flicker according to the present embodiment and the comparative example. Effects of the present embodiment will be described with reference to FIG. 4.

The voltage Va at the point A is the input voltage to the voltage increase power supply unit 150 and the voltage decrease circuit 140. In the comparative example, the voltage Va at point A is the input voltage to the control IC 130. First, the normal operation state of the comparative example will be described. Since the main computer 170 consumes a large current in the normal operation state, the voltage Va at the point A, that is, the input voltage to the voltage decrease circuit 140 may drop to a range of 3.4 V to 3.7 V in response to occurrence of brownout or power flicker. The voltage decrease circuit 140 needs to supply an output voltage Vo of 3.3 V. Therefore, the voltage drop amount ΔV allowed for the switching element such as the high side MOSFET 141 included in the voltage decrease circuit 140 is as small as 0.1 to 0.3 V.

In the normal operation state, the current I flowing through the voltage decrease circuit 140 is a large current. As an example of a large current I, 5A is shown in FIG. 4. In order to reduce the voltage drop in a state where the large current flows, it is necessary to reduce the on-resistance Ron of the high side MOSFET 141. In the comparative example, the voltage Va at the point A is also input to the control IC 130. When the voltage Va at the point A is low, the voltage at a point B, that is, the voltage applied by the driver 132 to the high side MOSFET 141 and the voltage applied by the driver 133 to the low side MOSFET 142 also decrease. As a result, the gate-source voltages Vgs of the high side MOSFET 141 and the low side MOSFET 142 become a low voltage.

The high side MOSFET 141 and the low side MOSFET 142 each is required to have a low on-resistance Ron under the low gate-source voltage. That is, in the comparative example, the high side MOSFET 141 and the low side MOSFET 142 each is required to have a characteristic that the on-resistance Ron becomes low at a low gate-source voltage, that is, in the active region. As well known, MOSFETs operate in the active region under low gate-source voltage. However, MOSFETs having such characteristics are expensive.

In the present embodiment, the voltage increased by the voltage increase power supply unit 150 is input to the control IC 130. Therefore, when the voltage drops temporarily, the voltage input to the control IC 130 can maintain a higher voltage than that of the comparative example. As a result, the gate source voltages of the high side MOSFET 141 and the low side MOSFET 142 can maintain high values even when the temporary voltage drop occurs. That is, different from the comparative example, the high side MOSFET 141 and the low side MOSFET 142 each is not required to have a characteristic that the on-resistance Ron becomes low at a low gate-source voltage, that is, in the active region.

The following will describe the operation of ECU in the standby state with reference to FIG. 4. First, the operation of the ECU according to the comparative example in the standby state will be described. In the standby state, the main computer 170 has a low current consumption. Therefore, even if brownout or power flicker occurs, the voltage Va at the point A does not decrease as much as the voltage decrease in the normal operation state.

In the present embodiment, the output voltage Vo of the voltage decrease circuit 140 is set to 3.3 V in the standby state, which is the same as the output voltage in the normal operation. Therefore, in the standby state, the voltage drop amount ΔV allowed for the voltage decrease circuit 140 is 2.0 V. In the standby state, the current flowing through the voltage decrease circuit 140 is also small. FIG. 4 shows 0.1 A as an example of the current I flowing through the voltage decrease circuit 140 in the standby state. In the standby state, the voltage drop amount ΔV allowed for the voltage decrease circuit 140 is larger than the allowed voltage drop in the normal operation state, and the current flowing through the voltage decrease circuit 140 is small. Therefore, in the standby state, there is no problem with the high on-resistance Ron of the high-side MOSFET 141.

In the standby state, the voltage Va at the point A does not decrease as much as the voltage drop in the normal operation. Thus, the voltage at the point B generated based on the voltage Va at the point A can maintain a higher voltage than the voltage in the normal operation. In the standby state, the gate source voltages of the high side MOSFET 141 and the low side MOSFET 142 can maintain high values even when the temporary voltage drop occurs. When only the standby state is considered, the high side MOSFET 141 and the low side MOSFET 142 each is not required to have a characteristic that the on-resistance Ron becomes low at a low gate-source voltage, that is, in the active region.

In the standby state of the ECU 100 according the present embodiment, the voltage of the battery 2 is input to the control IC 130 without being increased by the voltage increase power supply unit 150. Therefore, as shown in FIG. 4, in the standby state, the voltage Va at the point A, the voltage drop amount ΔV allowed for the voltage decrease circuit 140, and the like are the same as those in the comparative example. Thus, in the vehicle power supply device 110 according to the present embodiment, even when the standby state is considered, the high side MOSFET 141 and the low side MOSFET 142 each is not required to have a characteristic that the on-resistance Ron becomes low at a low gate-source voltage, that is, in the active region.

Thus, in the present embodiment, in both of the operation state and the standby state, the high side MOSFET 141 and the low side MOSFET 142 each is not required to have a characteristic that the on-resistance Ron becomes low at a low gate-source voltage, that is, in the active region. Therefore, in the ECU 100 according to the present embodiment, normal MOSFETs with low cost can be used as the high side MOSFET 141 and the low-side MOSFET 142.

As described above, the ECU 100 of the present embodiment inputs the voltage output from the voltage increase power supply unit 150 to the control IC 130. As described above, the voltage increase power supply unit 150 is provided for supplying the input voltage to the USB port 191 and the camera port 192. As a result, even if the voltage Va at the point A temporarily drops, it is possible to prevent the voltage input to the control IC 130 from being dropped.

In the configuration according to the present embodiment, the power consumption of the voltage increase power supply unit 150 may increase both in the normal operation state and in the standby state. Therefore, in the standby state, the ECU 100 according to the present embodiment controls the voltage increase power supply unit 150 to operate in the power on state and deactivate the voltage increase operation so that the power consumption can be reduced. As described above, in the standby state, the output voltage Vo from the voltage decrease circuit 140 can maintain a predetermined voltage even when the voltage increase power supply unit 150 operates in the power on state or when the temporary voltage drop occurs due to brownout or power flicker.

In the standby state, the voltage increase power supply unit 150 is simply activated without performing the voltage increase operation. Thus, it is possible to prevent an increase in power consumption during the standby state. The remaining concern is the power consumption in the normal operation. FIG. 5 shows the power consumption of ECU according to the comparative example. Specifically, FIG. 5 shows the on or off state of voltage increase power supply unit 150, the on or off state of sub-voltage decrease power supply unit 160, and the on or off state of control IC 130 in each of the off state, the standby state, and the normal operation state of the ECU, and the current consumptions of the ECU in each of the off state, the standby state, and the normal operation state.

When the ECU is in the off state, the voltage increase power supply unit 150 is in the power on state in which the voltage increase operation is deactivated. In the off state, the sub voltage decrease power supply unit 160 and the control IC 130 are also in the off states. Therefore, there is no current consumption of the ECU. In the standby state, the voltage increase power supply unit 150 is in the power on state and the voltage increase operation is deactivated. In the standby state, the sub voltage decrease power supply unit 160 and the control IC 130 are in the on states. Therefore, the amount of current consumed in the standby state is the total value of the current consumed by the sub voltage decrease power supply unit 160 and the control IC 130, and the current consumed by the components that operate in the standby state. In the normal operation state, the amount of current consumption is a sum of a current consumed by the voltage increase power supply unit 150, a current consumed by the sub voltage decrease power supply unit 160, a current consumed by the control IC 130, and a current consumed in a circuit that operates with power supply from the vehicle power supply device 110.

FIG. 6 shows the current consumption of ECU 100 according to the present embodiment in the off state, the standby state, and the normal operation state. Specifically, FIG. 6 shows the on or off state of voltage increase power supply unit 150, the on or off state of sub-voltage decrease power supply unit 160, and the on or off state of control IC 130 in each of the off state, the standby state, and the normal operation state of the ECU 100, and the current consumptions of the ECU 100 in each of the off state, the standby state, and the normal operation state.

When the ECU 100 is in the off state, the voltage increase power supply unit 150 is in the power on state in which the voltage increase operation is deactivated, and the sub voltage decrease power supply unit 160 and the control IC 130 are in the off states. Therefore, there is no current consumption in the ECU 100. In the standby state of the ECU 100, the voltage increase power supply unit 150 is in the power on state in which the voltage increase operation is deactivated, and the sub voltage decrease power supply unit 160 and the control IC 130 are in the on states. Therefore, the current consumption of the ECU 100 in the standby state is the same as that of the ECU according to the comparative example.

In the normal operation state, the ECU 100 activates the voltage increase operation of the voltage increase power supply unit 150. In the normal operation state, the sub voltage decrease power supply unit 160 and the control IC 130 are in the on states. Therefore, the on and off states of the voltage increase power supply unit 150, the sub voltage decrease power supply unit 160, and the control IC 130 in the ECU 100 are the same as those of the ECU according to the comparative example. In the present embodiment, the voltage increased by the voltage increase power supply unit 150 is input to the control IC 130. Therefore, the current consumption of the control IC 130 is larger than that of the comparative example. Therefore, in the ECU 100 of the present embodiment, the amount of the increased voltage input to the control IC 130 during the normal operation corresponds to the amount of power loss compared with the comparative example.

In the normal operation state, for a current having an order of amperes, that is for several amperes, the current loss is several to several tens of milliamperes. Therefore, in the normal operation state, consuming of extra several to several tens of milliamperes is substantially small compared with the main current consumption.

The ECU 100 according to the present embodiment enables use of low-cost MOSFET as the high side MOSFET 141 and the low side MOSFET 142, and can also suppress an increase in the amount of current consumption.

Although the embodiment has been described above, the disclosed technology is not limited to the above-described embodiment, and the following modifications are included in the disclosed range, and various modifications can be made without departing from the spirit of the present disclosure. In the following description, elements having the same reference symbols as those used so far are the same as elements having the same reference symbols in the above embodiment, except when specifically mentioned. When only a part of the configuration is described, the embodiment described above can be applied to other parts of the configuration.

(First Modification)

For example, in the embodiment, the vehicle power supply device 110 and the main computer 170 supplied with power from the vehicle power supply device 110 are included in the same ECU 100. Alternatively, the vehicle power supply device 110 and the main computer 170 may be configured as external devices outside of the ECU 100.

(Second Modification)

The vehicle power supply device 110 may supply power to another device other than the computers.

(Third Modification)

The control unit and the method described in the present disclosure may be implemented by a special purpose computer including a processor programmed to perform one or more functions embodied by a computer program. Alternatively, the control unit and the method described in the present disclosure may be implemented by a dedicated hardware logic circuit. Alternatively, the control unit and the method described in the present disclosure may be implemented by one or more dedicated computers configured by a combination of a processor executing a computer program and one or more hardware logic circuits. The hardware logic circuits may include, for example, ASIC and FPGA.

The storage medium for storing the computer program is not limited to ROM. Alternatively, the computer program may be stored in a computer-readable, non-transitory tangible storage medium as instructions to be executed by a computer. For example, the program may be stored in a flash memory.

What is claimed is:

1. A vehicle power supply device comprising:

a voltage decrease circuit including multiple metal oxide silicon field effect transmitters as switching elements, the voltage decrease circuit being configured to:
  receive a voltage supplied from a battery;
  decrease, by turning on and turning off the switching elements, the received voltage to an operation voltage of an operation target device; and
  output the decreased voltage to the operation target device;

a control unit controlling an operation of the voltage decrease circuit;

a voltage increase power supply unit connected with the voltage decrease circuit in parallel, the voltage increase power supply unit being configured to:
  receive the voltage supplied from the battery;
  increases the received voltage; and
  output the increased voltage to the control unit; and a voltage increase control unit switching a state of the voltage increase power supply unit between a power on state in which a voltage increase operation is deactivated and a voltage increase operation state in which the voltage increase operation is activated, wherein the operation target device is provided by a computer, the computer is configured to operate:
  in a normal state in which a circuit operation is performed; and
  in a standby state in which a part of the circuit operation is deactivated, when the computer operates in the standby state, the voltage increase control unit controls the voltage increase power supply unit to operate in the power on state in which the voltage increase operation is deactivated, and when the computer operates in the normal state, the voltage increase control unit controls the voltage increase power supply unit to execute the voltage increase operation.

* * * * *